US012686060B2

(12) United States Patent (10) Patent No.: US 12,686,060 B2
Vater et al. (45) Date of Patent: Jul. 21, 2026

(54) TOOL HOLDER FOR A MACHINE TOOL

(71) Applicant: LEISTRITZ PRODUKTIONSTECHNIK GMBH, Pleystein (DE)

(72) Inventors: Bernhard Vater, Pleystein (DE); Tobias Lehner, Moosbach (DE)

(73) Assignee: LEISTRITZ PRODUKTIONSTECHNIK GMBH, Pleystein (DE)

( * ) Notice: Subject to any disclaimer, the term of this patent is extended or adjusted under 35 U.S.C. 154(b) by 428 days.

(21) Appl. No.: 18/367,002

(22) Filed: Sep. 12, 2023

(65) Prior Publication Data

US 2024/0082926 A1 Mar. 14, 2024

(30) Foreign Application Priority Data

Sep. 12, 2022 (DE) ...................... 10 2022 123 128.3

(51) Int. Cl.
B23B 27/16 (2006.01)
B23B 5/16 (2006.01)
(Continued)

(52) U.S. Cl.
CPC .................................... B23B 27/16 (2013.01)

(58) Field of Classification Search
CPC ........... B23B 27/16; B23B 5/16; B23B 5/165; B23B 5/166; B23B 5/167; B23B 31/1075;
(Continued)

(56) References Cited

U.S. PATENT DOCUMENTS 1,165,859 A * 12/1915 Ebert .................. B23B 29/0341
408/153
4,257,289 A * 3/1981 Groothius ............... B23B 5/162
144/205
(Continued)

FOREIGN PATENT DOCUMENTS

DE 3128121 A * 2/1983
DE 3128121 A1 2/1983
(Continued)

OTHER PUBLICATIONS

European Office Action Dated Dec. 11, 2023, 2 Pages.
German Office Action Dated May 5, 2023, 7 Pages.

*Primary Examiner* — Bayan Salone
(74) *Attorney, Agent, or Firm* — LUCAS & MERCANTI, LLP; Klaus P. Stoffel

(57) ABSTRACT

A tool holder for a machine tool, having a retaining component which can be rotated about an axis of rotation and on which a cutting tool is or can be fastened in a releasable manner, wherein the retaining component has at least two plug-in mounts, which are offset in the circumferential direction about the axis of rotation and are intended for receiving a respective cutting tool, having an elongate plug-in shank and a cutting portion, wherein each cutting tool is or can be fixed in the plug-in mount via a separate retaining device, and wherein the cutting tools delimit between them a receiving space for a workpiece which can be machined by the cutting tools together, the cutting tools having their cutting portions facing toward the receiving space.

15 Claims, 3 Drawing Sheets

(51) Int. Cl.
    *B23B 31/10*       (2006.01)
    *B23Q 1/00*       (2006.01)
    *B23Q 1/25*       (2006.01)
    *B23Q 3/12*       (2006.01)

(58) Field of Classification Search
    CPC .... B23B 2215/64; B23Q 1/25; B23Q 1/0054;
                                    B23Q 3/12
    See application file for complete search history.

(56)                 References Cited

U.S. PATENT DOCUMENTS

| | | | |
|---|---|---|---|
| 6,533,506 B1 * | 3/2003 | Hite | B23C 5/24 |
| | | | 408/153 |
| 11,524,347 B2 * | 12/2022 | Haex | B23C 5/10 |
| 2014/0069245 A1 * | 3/2014 | Tan | B23C 5/10 |
| | | | 409/80 |
| 2021/0094107 A1 * | 4/2021 | Haex | B23C 5/10 |

FOREIGN PATENT DOCUMENTS

| | | | | |
|---|---|---|---|---|
| DE | 102009038133 A1 * | 2/2011 | | B23G 5/18 |
| JP | H09309021 A * | 12/1997 | | |

* cited by examiner

TOOL HOLDER FOR A MACHINE TOOL

CROSS-REFERENCE TO RELATED APPLICATIONS

The present application claims priority of DE 10 2022 123 128.3, filed Sep. 12, 2022, the priority of this application is hereby claimed, and this application is incorporated herein by reference.

BACKGROUND OF THE INVENTION

The invention relates to a tool holder for a machine tool, having a retaining component which can be rotated about an axis of rotation and on which a cutting tool is or can be fastened in a releasable manner.

Tool holders are used in a wide variety of different machine tools. It is often the case that the tool holder, in its installed position, can be rotated about an axis of rotation, for which purpose it is coupled, on the machine tool, to a drive means, which rotates about an axis of rotation about which the tool holder also rotates. The tool holder has in the first instance a retaining component, via which it is coupled to the machine tool and/or the rotary drive provided there, wherein different interfaces such as, for example, a hollow shank taper interface (or HSK interface) or a steep taper interface (or SK interface) are provided for this purpose. The cutting tool via which a workpiece is to be machined is fastened on the retaining component itself. A use example of such a tool holder and/or of a machining process which can be implemented thereby is the surface machining of elongate cylindrical metal objects using a turning process. On the one hand, this turning process sets the elongate metal object to the desired diameter; on the other hand, a desired surface quality or surface finish can also be set using this turning process. An example of such elongate workpieces or metal parts is constituted by plugs or contact pins for electrical plug connections. These plugs or contact pins are sometimes very thin, often having a diameter of only a few millimeters. Up until now, for the turning process to take place, the elongate metal parts are machined on a lathe. The clamped-in metal part rotates, and the turning process is carried out by a cutting tool which is brought up to the metal part laterally and moved along the metal part. Extreme care has to be taken here since, if the lateral pressure applied by the cutting tool is too high, there is a risk of the metal part bending laterally. The thinner the metal object, the more serious this problem is.

SUMMARY OF THE INVENTION

The invention is based on the problem of specifying a tool holder for the machining of workpieces which is improved in relation to the prior art and allows, in particular, straightforward and reliable turning of an elongate workpiece.

In order to solve this problem, the invention makes provision, in the case of a tool holder of the type mentioned in the introduction, for the retaining component to have at least two plug-in mounts, which are offset in the circumferential direction about the axis of rotation and are intended for receiving a respective cutting tool, having an elongate plug-in shank and a cutting portion, wherein each cutting tool is or can be fixed in the plug-in mount via a separate retaining means, and wherein the cutting tools delimit between them a receiving space for a workpiece which can be machined by the cutting tools together, the cutting tools having their cutting portions facing toward the receiving space.

The tool holder according to the invention is distinguished by a retaining component on which two separate cutting tools can be secured and fixed in a precise position, it being possible for an elongate workpiece received between the cutting tools to be machined, that is to say for example turned, by means of the cutting tools jointly and simultaneously. For this purpose, the retaining component has two separate plug-in mounts, wherein a cutting tool can be plugged into each plug-in mount by way of an elongate plug-in shank provided on the cutting tool. The plug-in shank is fixed firmly on the retaining component via a suitable retaining means, so that each cutting tool is in a fixed position and does not move out of its operating position while the workpiece is being machined. The at least two plug-in mounts here, located on a common pitch circle, are offset preferably equidistantly in the circumferential direction about the rotation axis about which the tool holder rotates. In the case of two plug-in mounts, the latter are therefore located diametrically opposite one another and, since the cutting tools are preferably of identical design, are likewise of identical design. Accordingly, the two tools rotate symmetrically about the axis of rotation, but are correspondingly offset in the circumferential direction.

A preferably elongate tool portion extends from the respective plug-in portion, the tool portion having provided on it a cutting portion, via which the workpiece is machined. Since the two workpieces are spaced apart from one another in the circumferential direction, and radially in relation to the axis of rotation, this give rise to a receiving space between them, the workpiece which is to be machined being received in the receiving space for the machining process, that is to say the workpiece penetrates between the two cutting tools and/or the cutting portions thereof. This is because the cutting portions face toward the receiving space, which they delimit. Accordingly, within the context of the machining process, the fixed-position workpiece is machined simultaneously by the at least two rotating cutting tools and/or cutting portions, which is obviously beneficial for the machining speed. Furthermore, the at least two cutting tools and/or cutting portions are also supported together on the workpiece: in the case of two cutting tools, diametrically opposite one another; in the case of more than two cutting tools, in dependence on the number and preferably equidistant angular separation. This means that there are no lateral forces applied to the workpiece during the machining process, resulting from the cutting tools being supported symmetrically on the workpiece, and this advantageously avoids the workpiece being subjected to bending stress.

For the purpose of positioning the at least two tools, the latter are straightforwardly placed in the respective plug-in mount by way of their plug-in shank, wherein the plug-in mount is closed at the base, so that the plug-in shank runs against the receiving base. All that is then still necessary is for the cutting tools to be correspondingly fixed via the retaining means. This means that, on the one hand, straightforward fitting is possible but, on the other hand, cutting tools can be changed over just as straightforwardly.

A minimum of two plug-in mounts, and therefore cutting tools, are provided, these preferably being offset by 180° in the circumferential direction. It is preferable, however, to provide three plug-in mounts, and of course corresponding cutting tools, which are offset preferably equidistantly through 120° in the circumferential direction, or four plug-in mounts, and of course corresponding cutting tools, which are offset preferably equidistantly by 90° in the circumferential direction. This means that, accordingly, the workpiece takes place simultaneously using three or four cutting tools which, with symmetrical separation, are all supported symmetrically, or with symmetrical force distribution, on the workpiece received therebetween. Alongside a symmetrical separation of, for example, 120° or 90°, it is also conceivable to provide for asymmetrical separation. It is also conceivable, in principle, to form more than four plug-in mounts, and therefore to arrange more than four cutting tools, but this requires a correspondingly greater pitch-circle diameter, on which the cutting tools are arranged, and this then obviously also gives rise to a correspondingly larger receiving space for the machining of larger-diameter workpieces.

In a development of the invention, each plug-in mount can be delimited via at least one clamping portion, against which the plug-in shank of the respective cutting tool is or can be clamped via the retaining means. The plug-in mount is therefore provided with at least one specific clamping portion or forms one such, against which the plug-in shank is braced more or less radially in relation to the axis of rotation, and against which it is therefore secured via the retaining means. This respective clamping portion defines the corresponding final cutting-tool position, so that the clamping abutment of each plug-in shank against the clamping portion automatically positions each cutting tool, and accordingly also the corresponding cutting portions, precisely; there is no need for any additional adjustment or positioning. Rather, this takes place automatically as a result of the primarily radial clamping of each plug-in shank firmly against the clamping portion via the respective retaining means.

According to an advantageous development of the invention, provision can be made for the plug-in mounts to merge into one another in the direction of the axis of rotation to form a common depression. Each plug-in mount is necessarily designed in the form of a corresponding recess on the retaining component, the recess being made in the end side of the retaining component. According to this configuration of the invention, the two or more plug-in mounts merge into a common depression, and they are therefore open toward one another, so that a central depression or recess forms. This recess is ultimately widened radially in respect of each plug-in mount, wherein the respective plug-in shank engages in the respective plug-in mount. It is therefore the case that the depression, for the purpose of forming the respective plug-in mount, is provided with a radial widening in the direction of the outer side of the retaining component.

The cross section of the widening here is preferably shape-compatible in relation to a cross-sectional portion of the cutting tool or of the plug-in shank. This means that the cross section of the widening, which at least partially forms a plug-in mount, is shape-compatible in relation to, that is to say of identical shape to, a cross-sectional portion of the plug-in shank; the two therefore have a shape-compatible geometry. A minimal amount of play of a few hundredths of a millimeter is preferably provided between the plug-in shank and plug-in mount or the widening, so that a very close fit of the plug-in shank in the plug-in mount is achieved. This close fit or this minimal amount of play allows only a minimal amount of radial movement, via which the respective plug-in shank is clamped radially against the supporting portion by the retaining means. This means that the insertion of the plug-in shank into the respective plug-in mount and the shape compatibility along with the minimal amount of play already provide for more or less complete position adjustment, which is finalized by the bracing by the retaining means by virtue of the plug-in shank being clamped against the clamping portion, the small amount of play being bridged in the process.

Each radial widening here is preferably formed via a hole portion, wherein each hole portion preferably extends over more than 180° and the end edges of each hole form the clamping portions, against which it is possible for the respective plug-in shank, which is cross-sectionally shape-compatible with the hole portion, to be clamped via the retaining means. The common depression is therefore formed via a number of individual holes which overlap one another, this number corresponding to the number of cutting tools which are to be fixed. If two cutting tools are to be fastened, then two holes which overlap one another are made, this resulting in a common depression with a cross-sectional shape like that of an "8". If three holes are made, these likewise overlap to form a corresponding depression geometry having three rounded widenings; four holes give rise to a geometry having four rounded widenings, etc. It is possible here for the holes to be positioned such that—as seen in the cross section of the depression—they each have a surround angle in relation to the plug-in shank of more than 180°. Accordingly, the pitch-circle-like hole surrounds the plug-in shank, which is likewise rounded or partially cylindrical in the cross-sectional portion. The hole portions which extend beyond 180°, that is to say the end edges of the respective hole portion, form the clamping portions, against which the respective plug-in shank is clamped. This ensures that each plug-in shank is braced symmetrically at two points.

As an alternative to the formation of surround angles >180° and the formation of the resulting clamping portions, it is conceivable for each plug-in shank to have one or two supporting surfaces which are located at an angle in relation to one another and via which the plug-in shanks, in the installed position, are braced and supported radially in relation to one another. It is therefore the case that the plug-in shanks butt directly against one another by way of the planar supporting surfaces, wherein, in the case of more than two cutting tools which are to be clamped, two such supporting surfaces always have to be provided, each at the same angle in relation to one another (three cutting tools are at an angle of 120°, four cutting tools are at an angle of 90°, etc. so as to achieve an equal separation in each case). This gives rise to more or less self-centering and/or alignment during installation and/or bracing, in particular since, as described, each plug-in shank has only a minimal amount of play.

As described, each cutting tool or each plug-in shank is fixed via a separate retaining means. For this purpose, a development of the invention can provide, on the retaining component, a number of threaded holes, this number corresponding to the number of plug-in mounts, which open out in each case on an outer surface of the retaining component and of a plug-in mount and into which a respective retaining means, in the form of a retaining screw which runs against the plug-in shank, is or can be screwed. Each plug-in shank is therefore braced via a corresponding retaining screw, which provides for very straightforward fixing, especially since, as described above, the plug-in shank can only be moved in the plug-in mount with a minimal amount of play of a few hundredths or tenths of a millimeter, so that it is also the case that only minimal retaining-screw movement is necessary for bracing purposes.

Each threaded hole here preferably runs at an angle <90° in relation to the axis of rotation. This means that the central axis of the threaded hole runs obliquely in relation to the base of the plug-in mount or of the common depression. As a result, the plug-in shank, and therefore the cutting tool, is subjected to an axial force, via the retaining screw, on account of the oblique screwing-on action, which axial force pushes the plug-in shank against the base of the plug-in mount or of the common depression. This means that the plug-in shank, and therefore the cutting tool, is thereby braced not just radially against the clamping portion or portions of the plug-in mount, or alternatively against the adjacent plug-in shank(s) or supporting surface(s), but also axially against the base of the plug-in mount.

It is possible here to provide, on each plug-in shank, a planar run-on surface, against which the retaining screw runs perpendicularly. If the threaded hole is perpendicular to the axis of rotation, it is likewise possible for this run-on surface to run parallel to the axis of rotation. However, as described, the threaded hole preferably runs at an angle <90° in relation to the axis of rotation, so that, accordingly, the run-on surface is also located at a corresponding angle. If the respective retaining screw is then screwed perpendicularly onto the run-on surface, then any axial positioning move-ment can be ruled out thereby, and by virtue of the resulting axial bracing, since the retaining screw is supported via the oblique run-on surface.

It is also possible for each threaded hole to open out on the outer surface of a planar screw-in surface. This makes it easier for the threaded hole to be made in the retaining component. Each threaded hole is preferably a countersunk hole, so that the respective screw head can be recessed.

As described, the tool holder according to the invention, or the cutting tools provided therein, can be designed to implement various machining processes. However, the cut-ting portions of the cutting tools are particularly preferably designed for the turning of a pin-like workpiece for the purpose of forming a cylindrical workpiece surface. To this end, each cutting portion can have the actual cutting region and also an adjoining exit portion, which is located at a small angle in relation to the axis of rotation; this means that, as seen from the point of entry, the respective cutting edge first of all has the actual cutting region, and this then widens marginally at an angle of 0.2°-1°, preferably approximately 0.5°, in the exit portion, and this avoids jamming of the one or more cutting tools on the workpiece.

Alongside the tool holder itself, the invention relates to a machine tool comprising a drive device with a receiving means which can be rotated about an axis of rotation, and also comprising a tool holder of the type described above, the tool holder being received or receivable in the receiving means and the axis of rotation thereof coinciding with the axis of rotation of the receiving means. The receiving means can have any desired interface, for example a hollow shank taper interface or steep taper interface, the retaining com-ponent obviously having a corresponding, compatible inter-face geometry.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
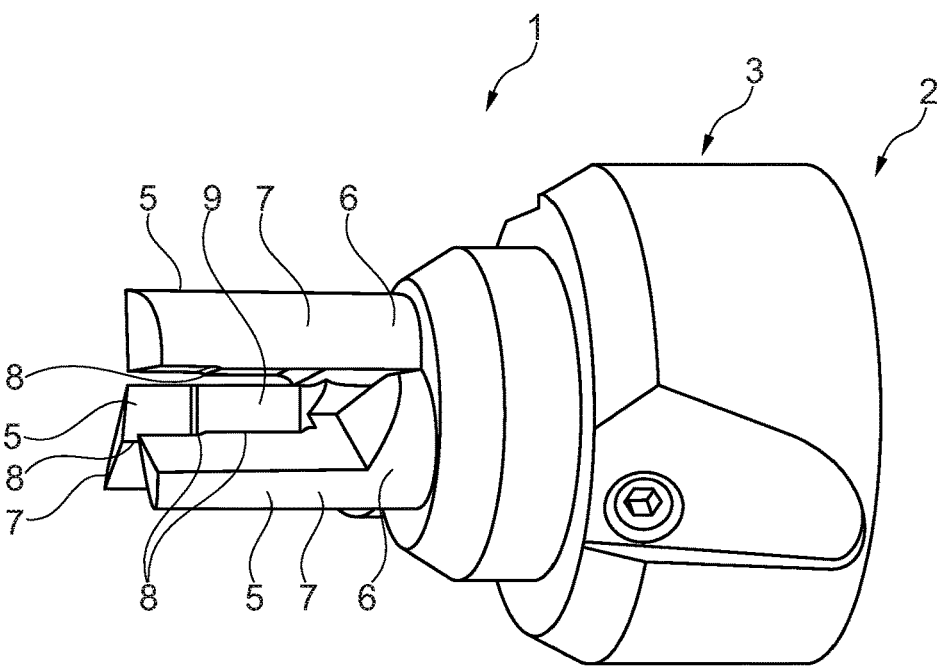
FIG. 1 shows a perspective view of a tool holder accord-ing to the invention comprising a retaining component and also cutting tools secured thereon.

FIG. 1 shows a tool holder 1 according to the invention which can be connected in a manner known per se via a correspondingly designed fastening interface 2, for example a hollow shank taper interface or steep taper interface, to a holder mount of a drive unit of a machine tool. The tool holder 1 comprises a retaining component 3, on which the installation interface 2 is provided. In the example shown, a total of four separate plug-in mounts 4 are provided on the retaining component 3, which—see FIG. 3—can be rotated, in the installed position, about a central axis of rotation R, and a respective cutting tool 5 is inserted into the plug-in mounts by way of a plug-in shank 6 (see, in this respect, also FIGS. 5, 6 and 9) and is fixed via a suitable retaining means. The retaining mounts 4 are located on an identical pitch circle in the circumferential direction and are distributed—in the example shown—equidistantly about the axis of rotation R, to give a separation of 120°. Each cutting tool 5 here has a cutting extension 7, which adjoins the plug-in portion and on which a respective cutting portion 8 in the form of a cutting edge is formed. The cutting portions 8, that is to say the cutting edges, are spaced apart from one another and delimit between them an accommodating space 9, into which a pin-like or stud-like workpiece to be machined is introduced, so that it can be machined, in particular turned, via the cutting portions 8, that is to say the cutting edges.

Figure 2:
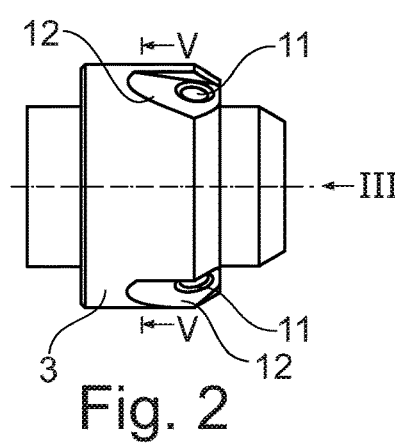
FIG. 2 shows a side view of the retaining component.
Figure 3:
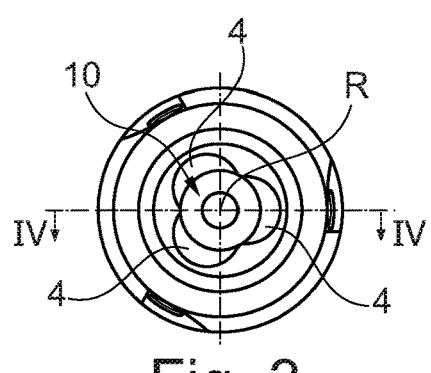
FIG. 3 shows a front-side view in the direction of arrow III from FIG. 2.

As FIGS. 2 and 3 show, the end side of the retaining component 3 is provided with a corresponding depression 10, wherein this depression 10 is formed by means of three separate holes, wherein these holes, which are offset equi-distantly by 120° about the axis of rotation R, overlap to give the shape of depression shown in FIG. 3. The plug-in mounts 4 here are formed in part via corresponding radial widenings and, as they result from the respective hole, they are inevi-tably rounded in cross section. A plug-in shank 6, which, as far as the rounded shape of the radial widenings is con-cerned, is of correspondingly shape-compatible design, is plugged into each of these rounded plug-in mounts 4, and a type of form fit is achieved as a result. In the direction of the center of the common depression 10, the plug-in portions are of appropriately planar-surface design, which will be discussed in more detail hereinbelow, and this also results more or less in a form fit there.

Figure 4:
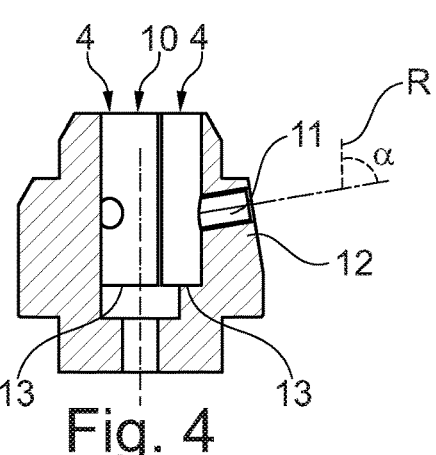
FIG. 4 shows a sectional view in the direction of line IV-IV from FIG. 3.

Opening out in each plug-in mount 4 is a threaded hole 11, which opens out on the outer side of the retaining component 3, specifically on a planar screw-in surface 12 there. Each threaded hole 11 here—see, in particular, FIG. 4—runs at an angle α in relation to the axis of rotation R, which is only indicated in FIG. 4, where α is <90°. This means that the longitudinal axis of each threaded hole 11 is inclined slightly and runs in each case in the direction of a base 13 of each plug-in mount 4, as a result of which each plug-in shank 6, and therefore each cutting tool 5, is braced axially in relation to the respective base 13 of the respective plug-in mount 4 as a result of the retaining screws, which will be described in more detail hereinbelow, being screwed in.

Figure 5:
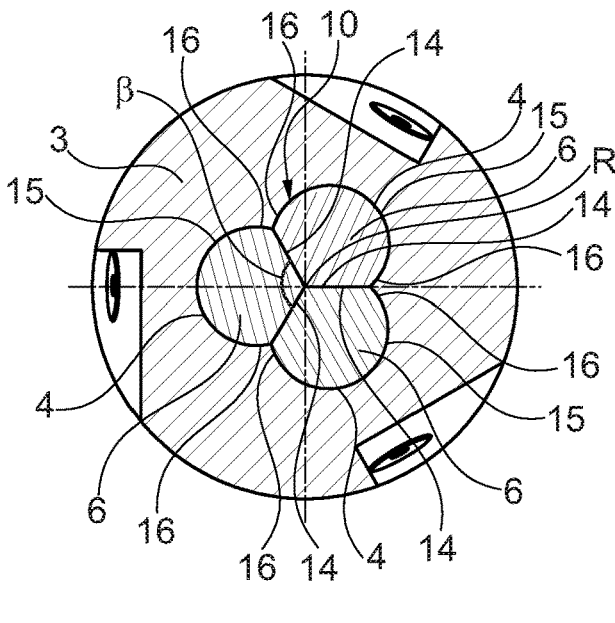
FIG. 5 shows a sectional view through the retaining component along line V-V from FIG. 2, with cutting tools inserted.

FIG. 5 shows a sectional view through the retaining component 3 in the direction of line V-V in FIG. 2, an illustration being given here of the inserted cutting tools 5 or plug-in shanks 6. On the one hand, the figure shows the common depression 10 and also the corresponding plug-in mounts 4, each defined via the respective radial widenings. It can be seen that the plug-in mounts 4 are formed via separate, axially running holes, which overlap one another to form the common depression 10. In addition, the figure shows the respective plug-in shanks 6 of the three cutting tools 5 received, and it can be seen that this results in a respective form-fit geometry in relation to the rounded widenings. In the direction of the axis of rotation R, each plug-in shank 6 has two corresponding surfaces 14, which enclose between them an angle β of 120°, as is indicated in FIG. 5.

FIG. 5 also shows that each plug-in mount 4 has its rounded widening surrounding the respective plug-in shank 6 by an angle >180°. This means that the respective hole wall of the respective plug-in mount 4 engages by more than 180° around each plug-in shank 6 by more than 180°. Accordingly, each plug-in mount 4, which is formed via a corresponding hole portion 15 (corresponding to a widening), has two end edges 16 serving as clamping portions, against which each plug-in shank 6 is clamped radially via the respective retaining screw. This means that the end edges 16 form corresponding clamping portions, resulting from the surround by more than 180°, via which radial clamping portions can be realized in a straightforward manner. Each plug-in shank 6 is received in the respective plug-in mount 4 with a minimal amount of play of preferably a few hundredths of a millimeter, so that straightforward axial insertion is possible on account of the small amount of play, but at the same time it is also the case that complete, fixed-position bracing via a respective retaining screw is possible in a very straightforward manner since all that is required for bracing purposes is for a minimal amount of play in relation to the respective end edges 15, that is to say the clamping portions, to be bridged.

Figure 6:
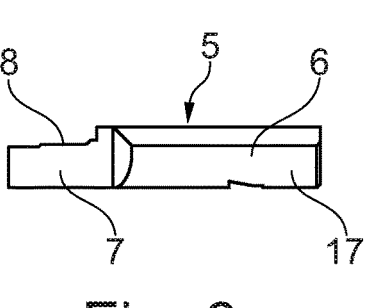
FIG. 6 shows a side view of a cutting tool.
Figure 7:
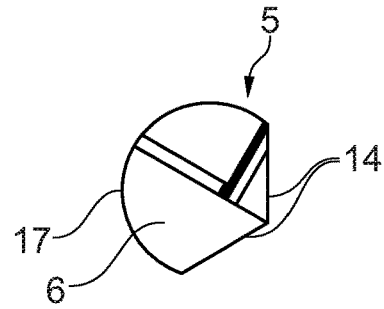
FIG. 7 shows a view of the cutting tool from FIG. 6 in the direction of arrow VII.

FIGS. 6 and 7 respectively show a side view and a front-side view of a cutting tool 5. It is possible to see the respective plug-in shank 6 and also the adjoining cutting extension 7. As the figures show, each plug-in shank 6 is designed, on one side, with a corresponding partially cylindrical shank surface 17, which corresponds to the geometry of the hole portions 15 of the plug-in mounts 4. The respective partially cylindrical shank surfaces 17 are adjoined by the two planar shank surfaces 14, which form between them the angle β, as already described in relation to FIG. 5.

Figure 8:
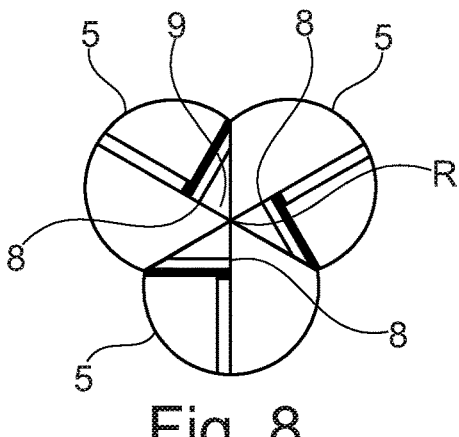
FIG. 8 shows a plan view of three cutting tools located in the insertion position, but without a retaining component.

FIG. 8 shows a plan view of the arrangement of the three cutting tools according to the exemplary embodiment from FIG. 5. Also illustrated are the respective cutting portions 8 in the form of the respective cutting edges, which delimit between them the receiving space 9.

Figure 9:
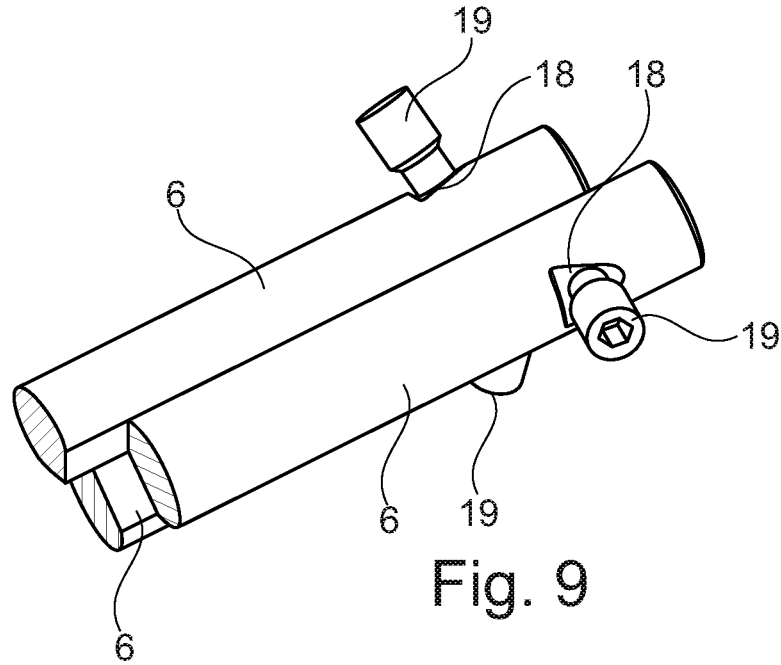
FIG. 9 shows a perspective detail-form view of three cutting tools, with an illustration given of the retaining screws.

FIG. 9 shows a detail-form view of the three cuttings tools 5 with their plug-in shanks 6 in the installed position, wherein, to aid clarity, the retaining component has not been shown. Each plug-in shank 6 has a planar run-on surface 18, adjacent to which, in the insertion position, the respective threaded hole 11 opens out. Also shown are the respective retaining screws 19, which are screwed into the respective threaded holes 11 and which run against the run-on surfaces 18. The run-on surfaces 18 likewise run at an angle in relation to the axis of rotation R, wherein the corresponding angle ultimately corresponds to the angle α, at which the threaded holes 11 are inclined, so that each retaining screw 19 runs vertically onto the respective run-on surface 18. On the one hand, this provides for locking in the axial direction, that is to say that axial movement is completely ruled out by the abutting retaining screws 19. In addition, these oblique positions both of the threaded holes 11 and of the run-on surfaces 18 give rise to an axial force component in the direction of the respective base 13 of the plug-in mounts 4 and also a radial force component in the direction of the end edges 16, so that the screwing action clamps the plug-in shanks 6 both axially against the base surfaces 13 and radially against the end edges 16.

In order for the retaining component 3 to be fitted out, all that is required is for the three cutting tools 5 to be plugged, by way of their plug-in shanks 6, into the corresponding plug-in mounts 4. Incorrect positioning is ruled out as a result of the cross sections of the plug-in shanks 6 and the cross sections of the plug-in mounts 4 being shape-compatible. The plug-in shanks 6, which are received with a minimal amount of play in the plug-in mounts 4, are then braced by virtue of the respective retaining screws 19 being straightforwardly screwed into the threaded holes 11 and screwed against the plug-in shanks 6, which simultaneously achieves both radial bracing, in the direction of the axis of rotation, against the end edges 16 of the plug-in mounts 4 and/or of the hole portions 15 and axial bracing against the respective base 13 of the plug-in mounts 4. Since all the plug-in mounts 4, as well as the geometries thereof, are rotationally symmetrical and distributed preferably equidistantly in relation to the axis of rotation, it is therefore the case that the cutting portions 8, that is to say the respective cutting edges which subject the workpiece to machining action, are automatically positioned precisely in relation to one another by the cutting tools 5 being braced. The planar surfaces 14 of the plug-in shanks 6 do not come into contact with one another here since, as described, the plug-in shanks 6 are supported radially on the end edges 16, that is to say the corresponding clamping portions of each plug-in mount 4 or of each hole portion 15. A minimal amount of play of only a few hundredths of a millimeter remains.

Figure 10:
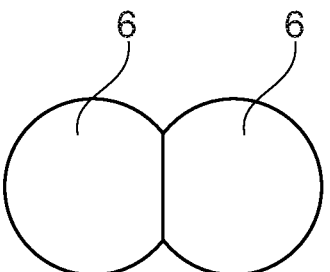
FIG. 10 shows a schematic diagram of the arrangement of two cutting tools, each in respect of their plug-in shanks.
Figures 11, 12:
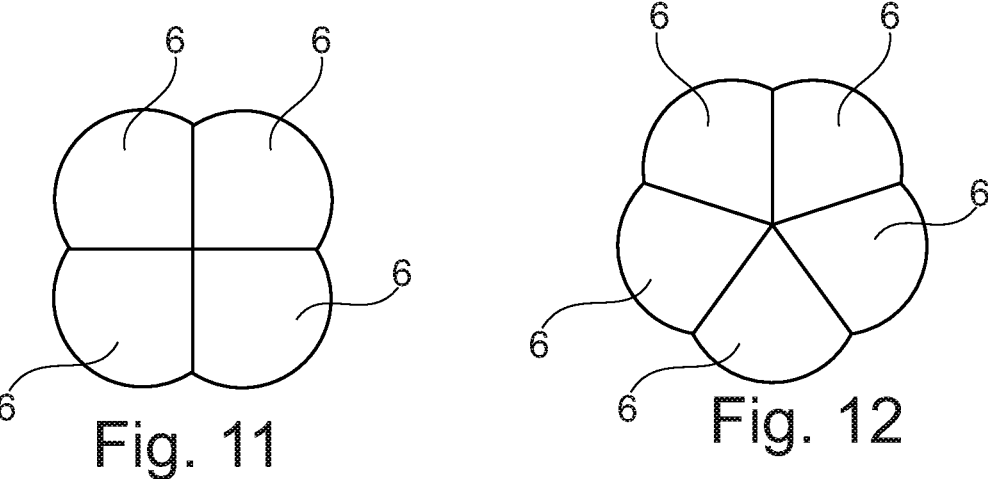
FIG. 11 shows a schematic diagram of four cutting tools, each in respect of their plug-in shanks.
FIG. 12 shows a schematic diagram of five cutting tools, each in respect of their plug-in shanks.

In the example shown, three plug-in mounts 4, for the purpose of retaining three cutting tools 5, are provided on the retaining component 3. FIGS. 10, 11 and 12 show embodiments which illustrate, in principle, different numbers of plug-in mounts 4, and therefore of cutting tools 5. These figures each show the plug-in shanks 6, and also the geometry thereof, in cross section, wherein this cross-sectional geometry is the same cross-sectional geometry as that of the respectively associated plug-in mount 4.

In the example according to FIG. 10, two plug-in mounts 4, and accordingly two cutting tools 5, can be positioned on the retaining component 3. The plug-in mounts 4 are located on the same pitch circle, offset by 180° about the axis of rotation R. Each plug-in shank 6 is essentially cylindrical; here too, the mutually facing surfaces are planar. Here too, the plug-in mounts 4 or the hole portions 15 have a surround angle of more than 180°, so that the respective end edges 16 of the respective hole portions 15, once again, form the clamping portions, against which the plug-in shanks 6 are clamped.

Four plug-in mounts 4 for four cutting tools 5 are shown for the exemplary embodiment according to FIG. 11. The plug-in shanks 6, once again, have corresponding, shape-compatible, partially cylindrical shank surfaces, each merging into two supporting surfaces, which are located at an angle of 90° in relation to one another and by way of which, in the example shown, the plug-in shanks 6 are supported in relation to one another, since in this case there is a surround angle of less than 180°. It is therefore the case here that the plug-in shanks 6 support one another directly. It is also the case here that the extremely small amount of play of only a few hundredths of a millimeter readily provides for precise positioning of all the cutting tools 5 in relation to one another.

Finally, FIG. 12 shows a variant with five plug-in mounts 4 for five cutting tools 5, in the case of which, once again, there is a corresponding, shape-compatible geometry in relation to the respective plug-in mounts 4 on the plug-in shank 6. The planar supporting surfaces here are at an angle of 72° in relation to one another and, here too, supported one another, since the smaller surround angle means that there are no end edges serving as clamping surfaces.

While specific embodiments of the invention have been shown and described in detail to illustrate the inventive principles, it will be understood that the invention may be embodied otherwise without departing from such principles.

We claim:

1. A tool holder for a machine tool, having a retaining component which can be rotated about an axis of rotation and on which a cutting tool is or can be fastened in a releasable manner, characterized in that the retaining component has at least two plug-in mounts, which are offset in the circumferential direction about the axis of rotation and are intended for receiving a respective cutting tool, having an elongate plug-in shank and a cutting portion, wherein each cutting tool is or can be fixed in the plug-in mount via a separate retaining means, and wherein the cutting tools delimit between them a receiving space for a workpiece which can be machined by the cutting tools together, the cutting tools having their cutting portions facing toward the receiving space, wherein the plug-in mounts merge into one another in the direction of the axis of rotation to form a common depression.

2. The tool holder according to claim 1, comprising the provision of three plug-in mounts, which are offset preferably equidistantly by 120° in the circumferential direction, or four plug-in mounts, which are offset preferably equidistantly by 90° in the circumferential direction.

3. The tool holder according to claim 1, wherein each plug-in mount is delimited via at least one clamping portion, against which the plug-in shank of the respective cutting tool is or can be clamped via the retaining means, or in that the plug-in shanks are braced in relation to one another via the retaining means.

4. The tool holder according to claim 1, wherein the depression, for the purpose of forming the respective plug-in mount, has a radial widening in the direction of the outer side of the retaining component.

5. The tool holder according to claim 4, wherein the cross section of the widening is shape-compatible in relation to a cross-sectional portion of the cutting tool.

6. The tool holder according to claim 5, wherein each radial widening is formed via a hole portion.

7. The tool holder according to claim 6, wherein each hole portion extends over more than 180° and the end edges of each hole portion form the clamping portions, against which it is possible for the respective plug-in shank, which is cross-sectionally shape-compatible with the hole portion, can be clamped via the retaining means.

8. The tool holder according to claim 1, wherein each plug-in shank has at least one supporting surface, preferably two supporting surfaces which are located at an angle in relation to one another and via which the plug-in shanks are braced and supported radially in relation to one another.

9. The tool holder according to claim 1, comprising the provision, on the retaining component, of a number of threaded holes, this number corresponding to the number of plug-in mounts, which open out in each case on an outer surface of the retaining component and of a plug-in mount and into which a respective retaining means, in the form of a retaining screw which runs against the plug-in shank, is or can be screwed.

10. The tool holder according to claim 9, wherein each threaded hole runs at an angle ($\alpha$) <90° in relation to the axis of rotation.

11. The tool holder according to claim 9, comprising the provision, on each plug-in shank, of a planar run-on surface, which the screw runs against retaining perpendicularly.

12. The tool holder according to claim 11, wherein each threaded hole opens out on the outer surface of a planar screw-in surface.

13. The tool holder according to claim 9, wherein the threaded hole is a countersunk hole.

14. The tool holder according to claim 1, wherein the cutting portions of the cutting tools are designed for the turning of a pin-like workpiece for the purpose of forming a cylindrical workpiece surface.

15. A machine tool comprising a drive device with a receiving means which can be rotated about an axis of rotation, and also comprising a tool holder according to claim 1, the tool holder being received or receivable in the receiving means and the axis of rotation thereof coinciding with the axis of rotation of the receiving means.

* * * * *